(12) United States Patent
Mullen, Jr.

(10) Patent No.: US 6,585,297 B2
(45) Date of Patent: Jul. 1, 2003

(54) SINGLE-PIECE LIQUID-TIGHT CONNECTOR WITH SNAP-ON CUFF

(75) Inventor: Thomas M. Mullen, Jr., Dunellen, NJ (US)

(73) Assignee: Heyco, Inc., Toms River, NJ (US)

( * ) Notice: Subject to any disclaimer, the term of this patent is extended or adjusted under 35 U.S.C. 154(b) by 0 days.

(21) Appl. No.: 09/955,694

(22) Filed: Sep. 19, 2001

(65) Prior Publication Data

US 2002/0033601 A1 Mar. 21, 2002

Related U.S. Application Data

(60) Provisional application No. 60/234,079, filed on Sep. 20, 2000.

(51) Int. Cl.$^7$ ............... F16L 11/118; F16L 25/02
(52) U.S. Cl. ............... 285/149.1; 285/151.1; 285/921; 285/251
(58) Field of Search ............... 285/149.1, 92, 285/903, 151.1, 115, 921, 45, 251

(56) References Cited

U.S. PATENT DOCUMENTS

| | | | |
|---|---|---|---|
| 2,475,322 A | | 7/1949 | Horton et al. |
| 3,262,721 A | * | 7/1966 | Knight ............... 285/148.14 |
| 3,972,547 A | | 8/1976 | Itoya |
| 4,194,768 A | * | 3/1980 | Gretz ............... 285/148.27 |
| 4,225,162 A | * | 9/1980 | Dola ............... 174/65 R |
| 4,302,035 A | | 11/1981 | Ochwat |
| 4,400,022 A | * | 8/1983 | Wright ............... 285/256 |
| 4,457,544 A | | 7/1984 | Snow et al. |
| 4,494,779 A | | 1/1985 | Neff et al. |
| 4,708,370 A | * | 11/1987 | Todd ............... 277/615 |
| 4,903,995 A | * | 2/1990 | Blenkush et al. ............... 285/255 |
| 5,132,493 A | | 7/1992 | Sheehan |
| 5,346,264 A | | 9/1994 | Law et al. |
| 5,388,866 A | * | 2/1995 | Schlosser ............... 285/319 |
| 5,984,373 A | | 11/1999 | Fitouss et al. |
| 6,044,868 A | | 4/2000 | Gretz et al. |
| 6,102,442 A | | 8/2000 | Gretz |
| 6,102,445 A | | 8/2000 | Thomas |
| 6,231,085 B1 | * | 5/2001 | Olson ............... 285/148.19 |

FOREIGN PATENT DOCUMENTS

FR 2528533 12/1983

* cited by examiner

Primary Examiner—Lynne H. Browne
Assistant Examiner—Aaron M Dunwoody
(74) Attorney, Agent, or Firm—Selitto, Behr & Kim (57) ABSTRACT

A liquid-tight connector is attached at one end to an aperture in a junction box, a panel box, a motor or the like. The opposite end of the connector is adapted to receive a free end of a length of flexible conduit. A cuff is positioned on the connector to conceal the free end of the conduit from view.

19 Claims, 11 Drawing Sheets

SINGLE-PIECE LIQUID-TIGHT CONNECTOR WITH SNAP-ON CUFF

CROSS REFERENCE TO RELATED APPLICATION

This is a §111(a) application relating to U.S. application Ser. No. 60/234,079 filed Sep. 20, 2000.

FIELD OF THE INVENTION

The present invention relates to fittings for connecting flexible conduits to apertures of junction boxes, panel boxes, motors or other similar devices, in a liquid-tight manner.

BACKGROUND OF THE INVENTION

There are various types of fittings for connecting flexible and corrugated conduits to apertures of junction boxes, panel boxes, motors or other similar devices. Many of these fittings have liquid-tight connectors that achieve a liquid-tight connection between the conduits and junction boxes. One such fitting is disclosed in U.S. Pat. No. 5,346,264, which is assigned to Heyco Molded Products, Inc., the corporate predecessor to the assignee of the present invention and present application. More particularly, U.S. Pat. No. 5,346,264 discloses a fitting with a liquid-tight internal connector that is specifically adapted for connecting with corrugated plastic conduit and which has many of the same basic elements as the present invention.

A short-coming of the prior art fittings relates to the appearance of the conduit-to-junction box connection. Typically, preparation of the conduit for connection to the junction box involves cutting the conduit so that the conduit is the appropriate length. Cutting of the conduit very often results in the conduit having a jagged, uneven end to be mounted onto the fitting, giving the fitting and conduit assembly a careless and unattractive appearance. Accordingly, there is a need for a fitting that both achieves a liquid-tight connection and also covers the cut jagged end of the conduit mounted thereon.

SUMMARY OF THE INVENTION

The present invention relates to single-piece fittings having a connector, a shoulder, an aperture engaging means and a snap-on cuff. The connector in each of the three embodiments discussed herein connects the fitting to a conduit and includes a distal end, a collared portion of larger diameter than the distal end and a small annular shoulder formed therebetween. As conduit is mounted onto the connector, the small annular shoulder and collared portion of the connector exert an outward force on the interior surface of the conduit, resulting in a liquid-tight connection. The connector in each embodiment is also provided with an annular mounting ridge and a plurality of locking flats. A plurality of arcuate indents is formed between the mounting ridge and shoulder of the fitting.

The snap-on cuff in each of the foregoing embodiments includes a washer-like base, having an annular lip on the internal circumference thereof and a plurality of cutouts that are sized and shaped to correspond to the locking flats of the connector. When the snap-on cuff is mounted onto the fitting, the cuff is rotated until the cutouts and locking flats are aligned. The cuff is then pushed into abutting contact with the shoulder of the fitting, whereupon the arcuate indents receive the annular lip and the mounting ridge locks the snap-on cuff onto the fitting. The snap-on cuff also includes an annular wall extending perpendicularly from the outer circumference of the washer-like base. The annular wall conceals the raw, cut end of the conduit from view, resulting in a neater and more attractive outward appearance.

In a preferred embodiment, the connector is externally threaded for connecting the fitting with flexible conduit and the aperture engaging means is of a conventional type having resilient fingers for snap connecting to the aperture of a junction box. In one alternative embodiment, the aperture engaging means is also of a conventional type, but having external threads rather than resilient fingers for connecting to the aperture of a junction box. In another alternative embodiment, the connector is a snap connector having resilient pawls, such as those disclosed in U.S. Pat. No. 5,346,264, for gripping the corrugations of corrugated conduit.

BRIEF DESCRIPTION OF THE DRAWINGS

For a better understanding of the present invention, reference is made to the following detailed description of several exemplary embodiments considered in conjunction with the accompanying drawings, in which.

DETAILED DESCRIPTION OF THE INVENTION

While the present invention has applicability to different fittings, it is especially suitable for fittings having internal liquid-tight connectors. Accordingly, the present invention will be described hereinafter in connection with fittings having internal liquid-tight connectors, it being understood that the present invention may also be adapted for use with fittings having internal connectors that are not liquid-tight. The various embodiments of the present invention will now be described in detail with reference to the figures, in which like reference numbers denote like parts in the various figures.

Figure 1A:
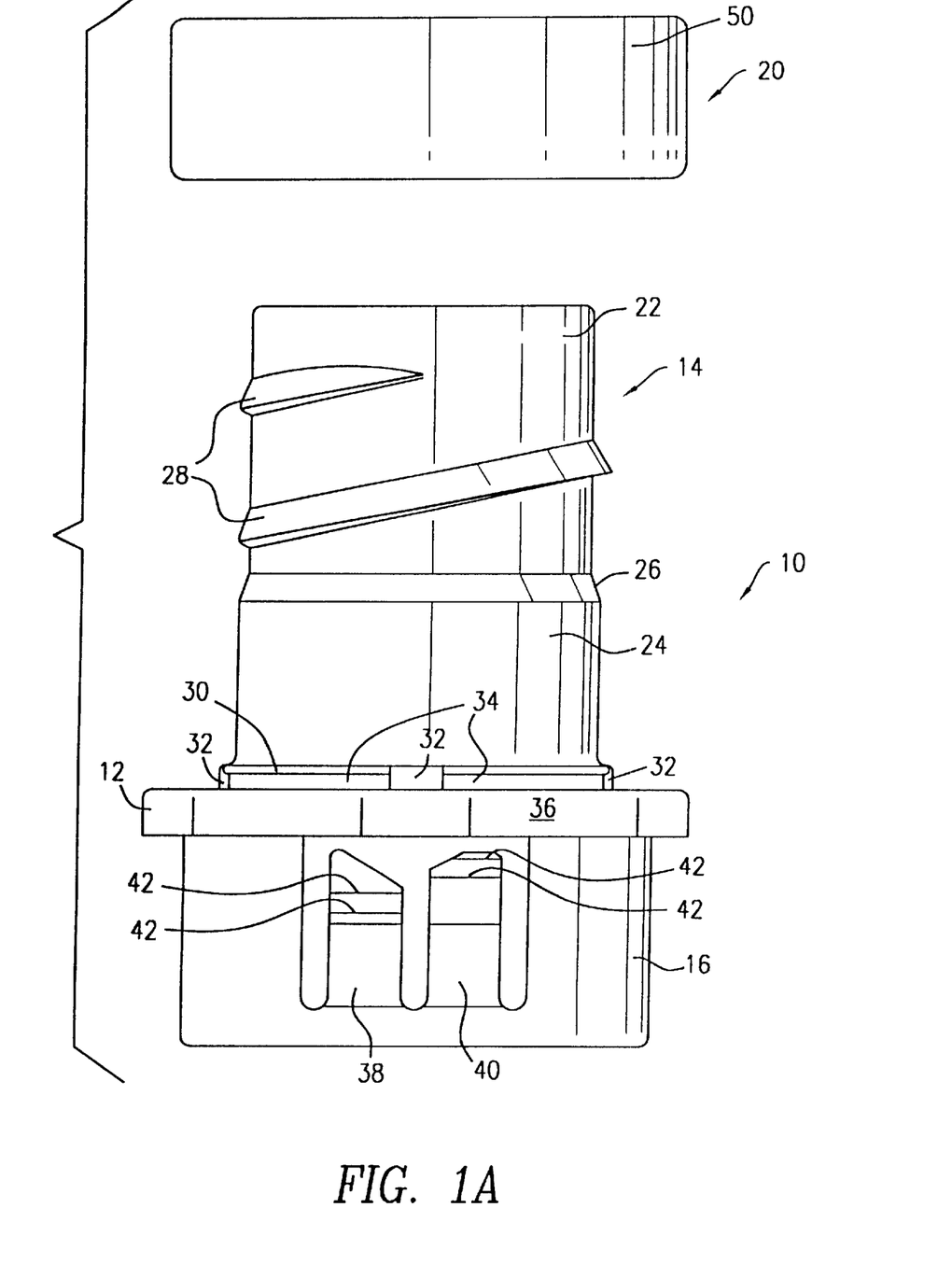
FIG. 1A is an exploded elevational view of the present invention, showing a fitting and a snap-on cuff in a disassembled state.
Figure 1B:
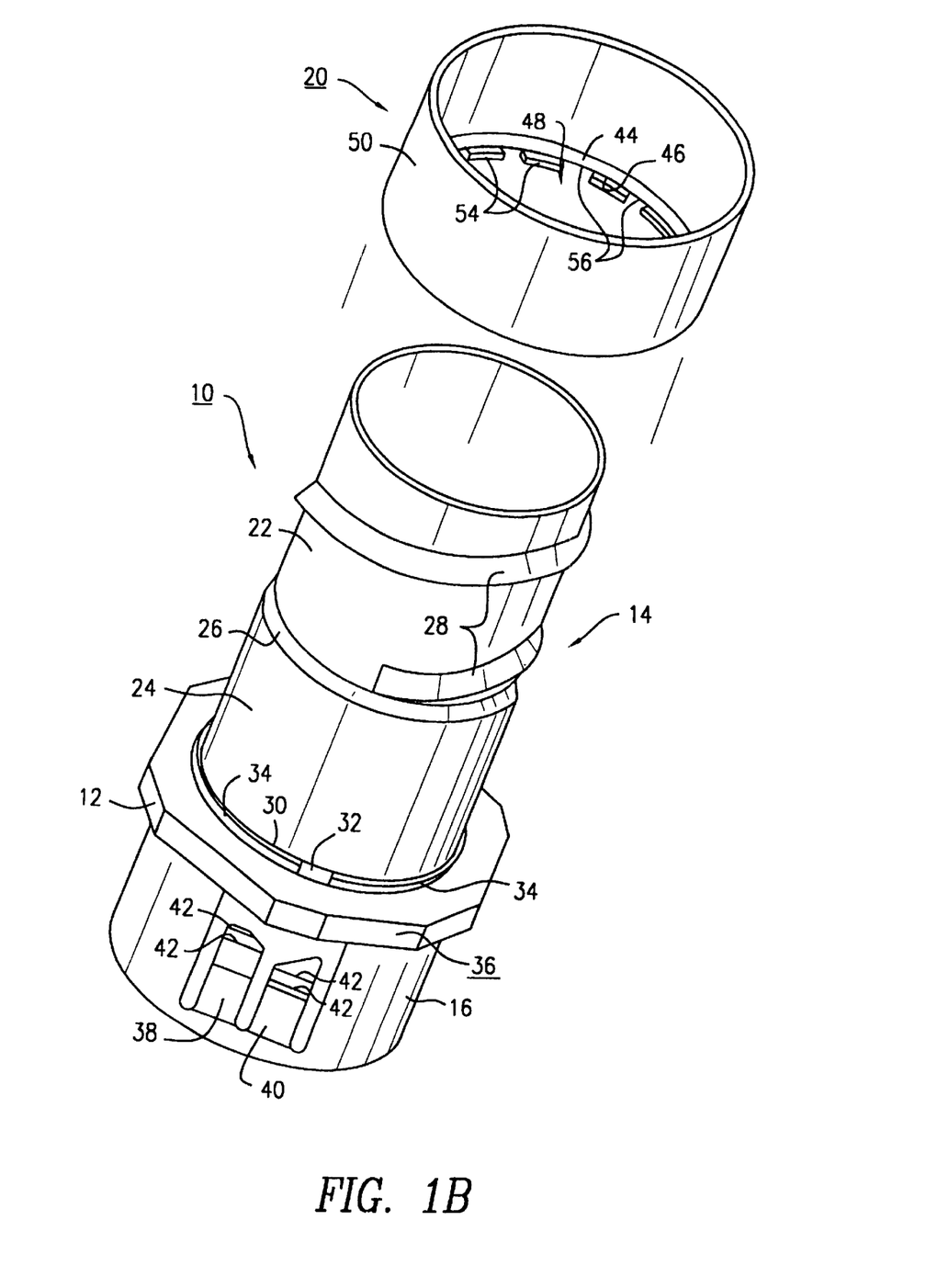
FIG. 1B is an exploded perspective view of the fitting and snap-on cuff of FIG. 1A.

Referring to FIGS. 1A–4, in general, and to FIG. 1B, in particular, a fitting 10 in accordance with the present invention includes a shoulder 12, an internal liquid-tight connector 14 extending from the shoulder 12 in one longitudinal direction and an aperture engaging means 16, shown in the form of a coupling device, extending from the shoulder 12 in the opposite longitudinal direction. As can be seen more clearly in FIGS. 3, 4 and 8, a bore 18 extends longitudinally through the fitting 10, including the connector 14, the shoulder 12 and the aperture engaging means 16. The fitting 10 also has a snap-on cuff 20 that is mounted on the connector 14 in a manner to be described hereinafter.

Figure 2:
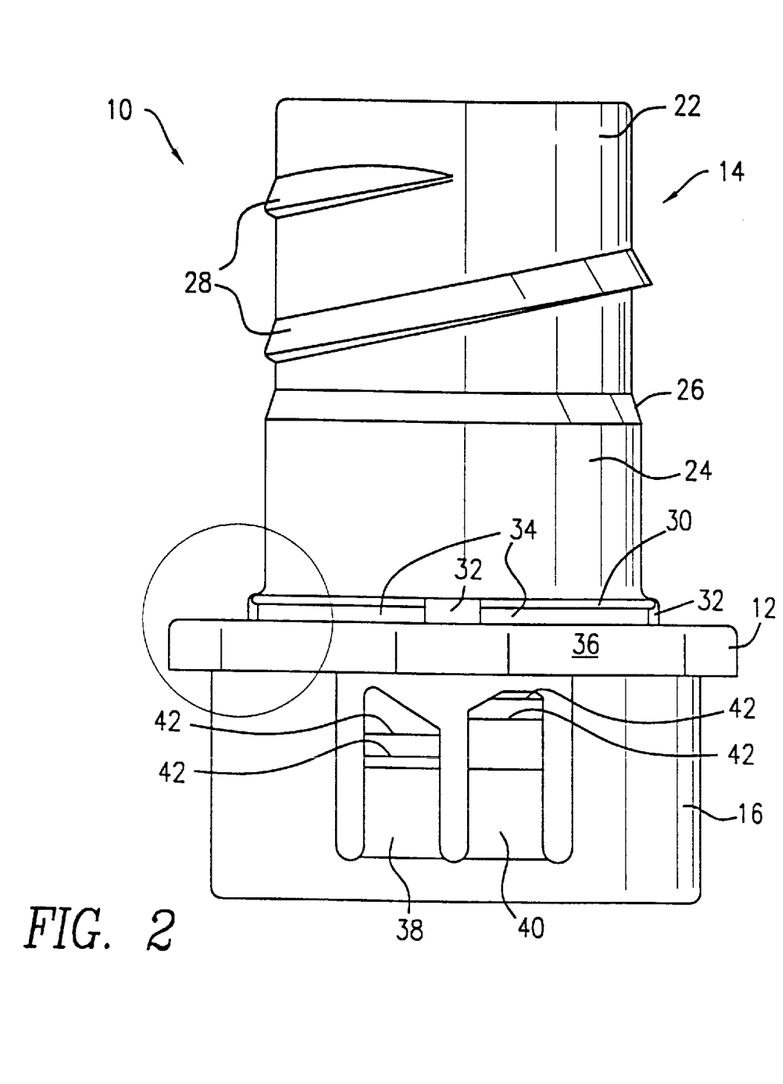
FIG. 2 is an elevational view of the fitting of FIG. 1, separate from the snap-on cuff.
Figure 2A:
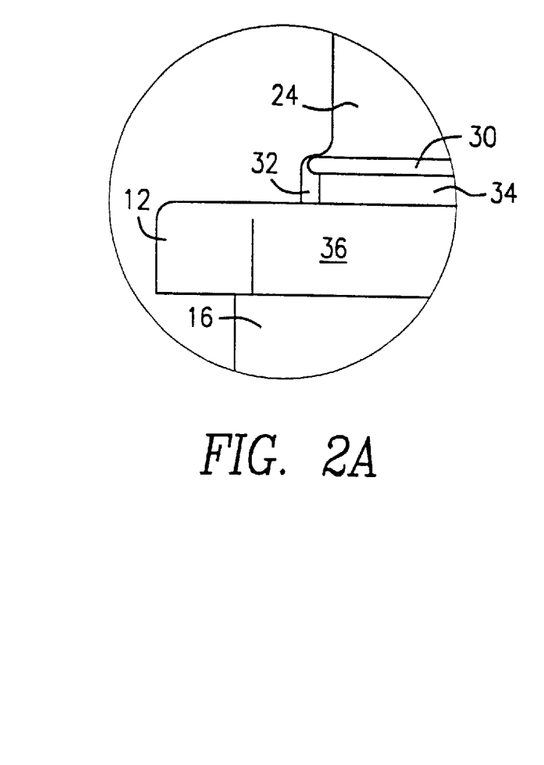
FIG. 2A is a partial enlarged view of the encircled portion of the fitting of FIG. 2, showing its annular mounting ridge and locking flats in greater detail.
Figure 3:
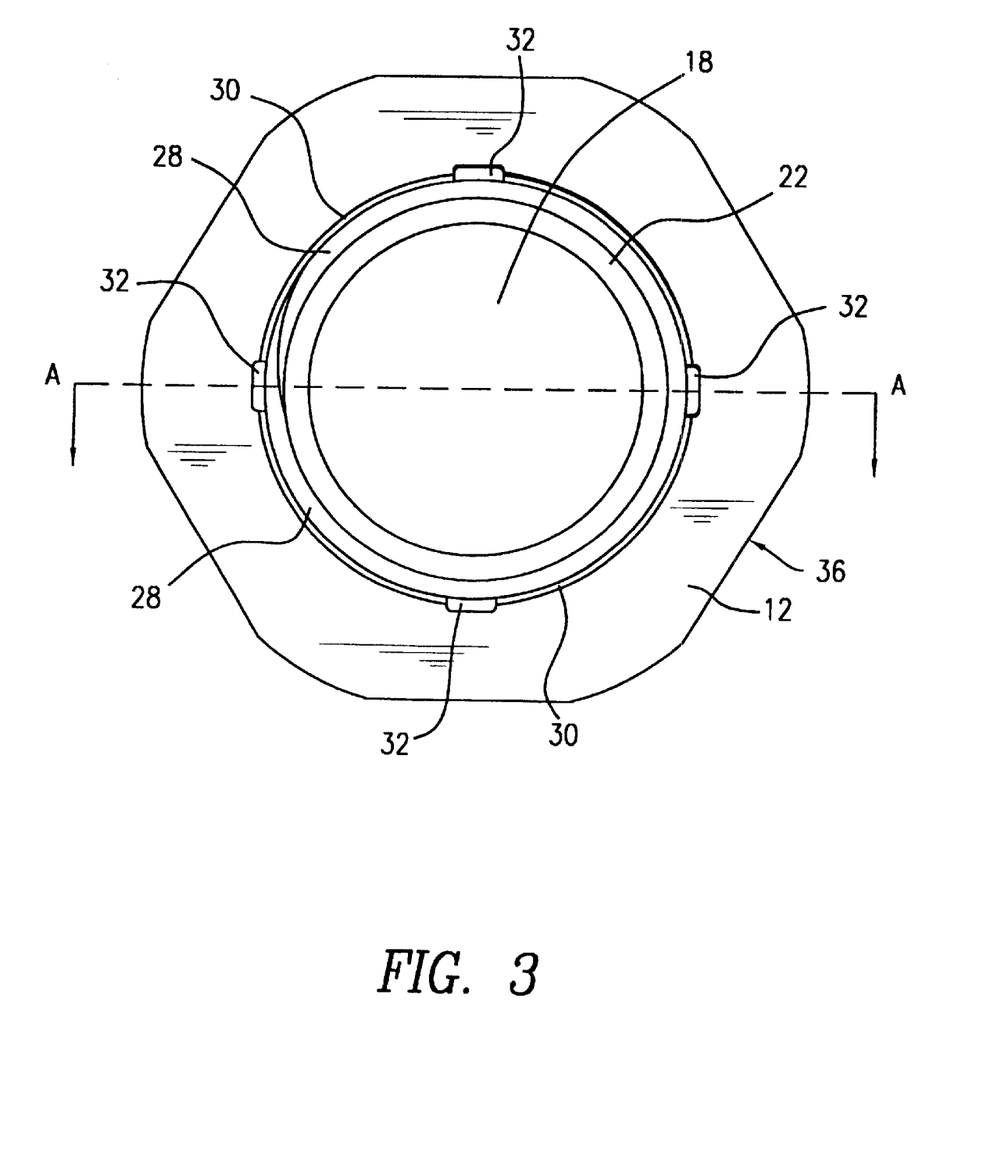
FIG. 3 is a top plan view of the fitting of FIG. 2.
Figure 4:
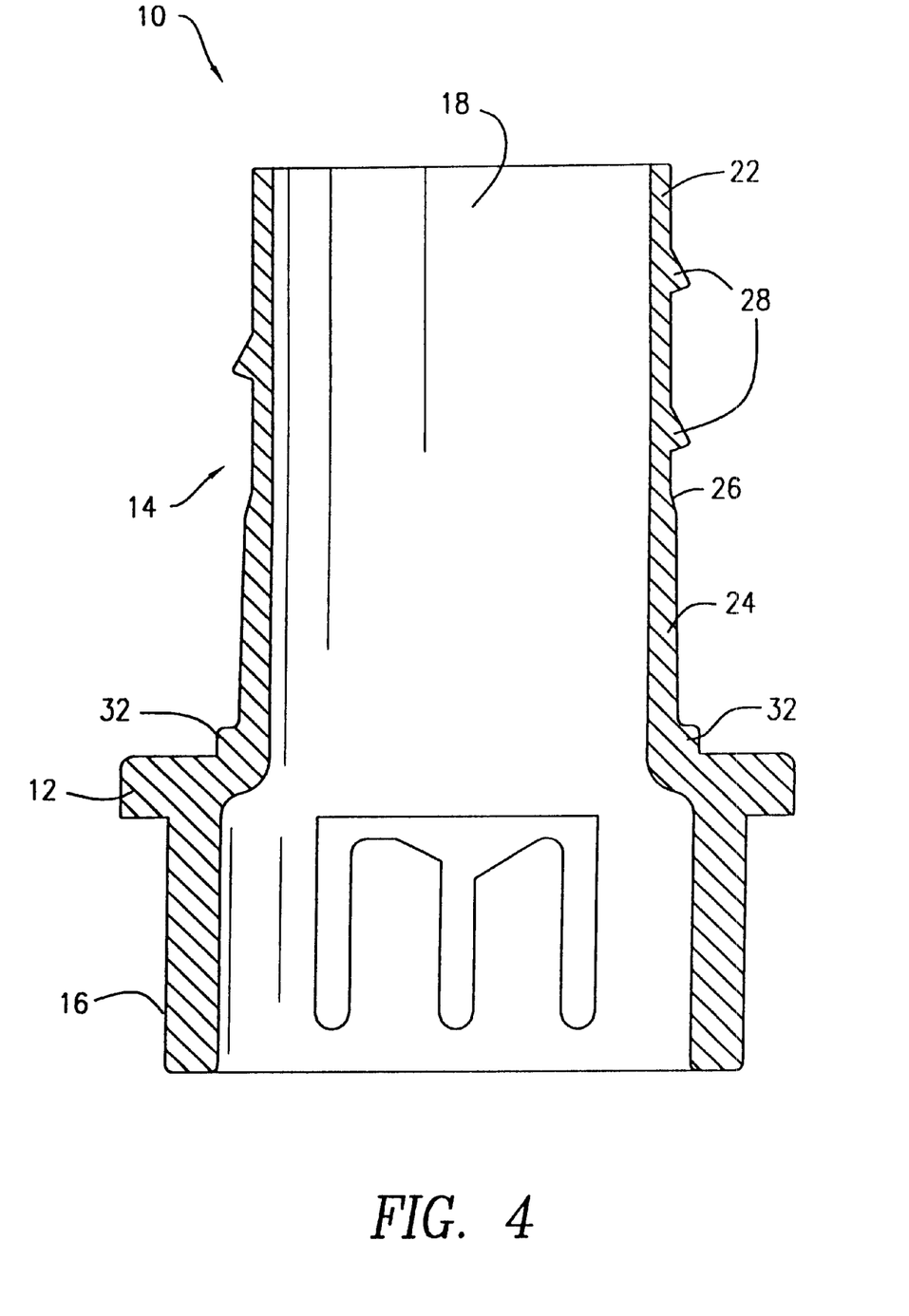
FIG. 4 is a cross-sectional view of the fitting of FIG. 3, taken along line A—A and looking in the direction of the arrows.

Referring now also to FIGS. 2, 2A, 3 and 4, the connector 14 has a distal end 22 and a collared portion 24 that is adjacent to the shoulder 12 and which is of greater outer diameter than the distal end 22 (see FIG. 2A). A small annular shoulder 26 is formed where the distal end 22 meets the collared portion 24. The distal end 22 of the connector 14 is provided with an external thread 28 for engaging the internal surface of a flexible conduit (not shown) to be mounted thereon.

The connector 14 also includes an annular mounting ridge 30 at the base of the collared portion 24 proximate to the shoulder 12 and a plurality of locking flats 32 (preferably four in number). A plurality of arcuate indents 34 (preferably four in number) form an annular trough between the mounting ridge 30 and the shoulder 12 for a purpose to be described hereinafter. Each of the locking flats 32 is spaced equidistant and opposite one another about the mounting ridge 30 and adjacent to the shoulder 12. As will be described in further detail hereinafter, the locking flats 32 guide the snap-on cuff 20 into the appropriate position for mounting onto the fitting 10, while the mounting ridge 30 locks the snap-on cuff 20 onto the fitting 10.

Referring still to FIGS. 1A–4, the shoulder 12 is shown having a hexagonal circumference 36 to facilitate the use of a wrench or other similar tool to hold the fitting 10 and prevent it from rotating while the flexible conduit is mounted onto the external thread 28 of the distal end 22 of the connector 14. It should be understood that the circumference 36 of the shoulder 12 need not be hexagonal, but rather, can be any desired shape such as circular, triangular or another polygonal shape.

The aperture engaging means 16, shown in FIGS. 1A, 1B, 2, 4, and 7 as a coupling device, is of a conventional type. More particularly, the aperture engaging means 16 of the preferred embodiment includes resilient 15 fingers 38, 40 having shoulders 42 for engaging the fitting 10 in an aperture, such as are found on junction boxes, panel boxes, motors and other similar devices.

Figure 5:
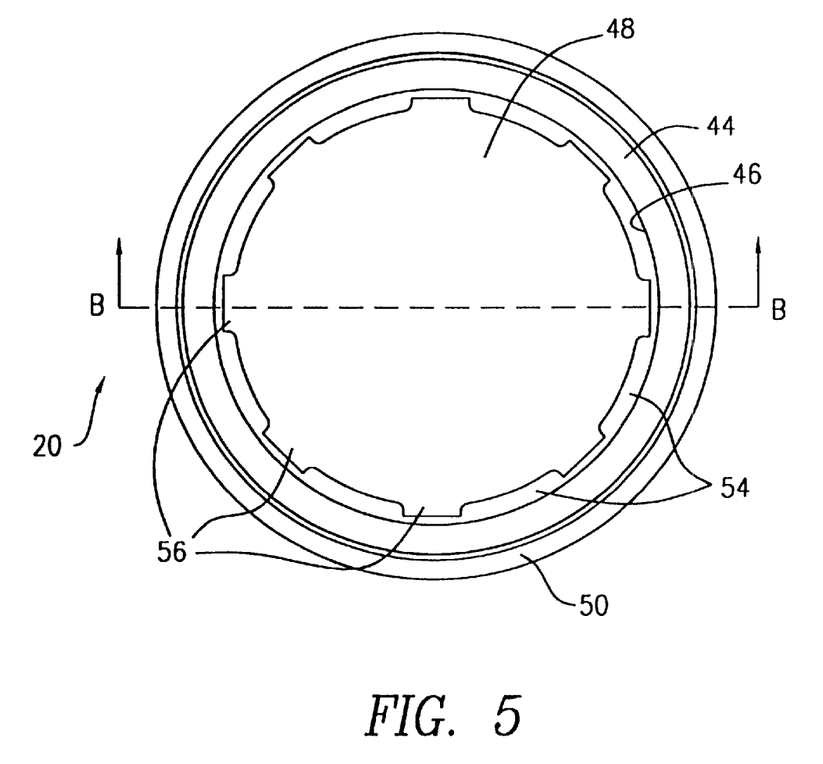
FIG. 5 is a top plan view of the snap-on cuff of FIG. 1.
Figure 6:
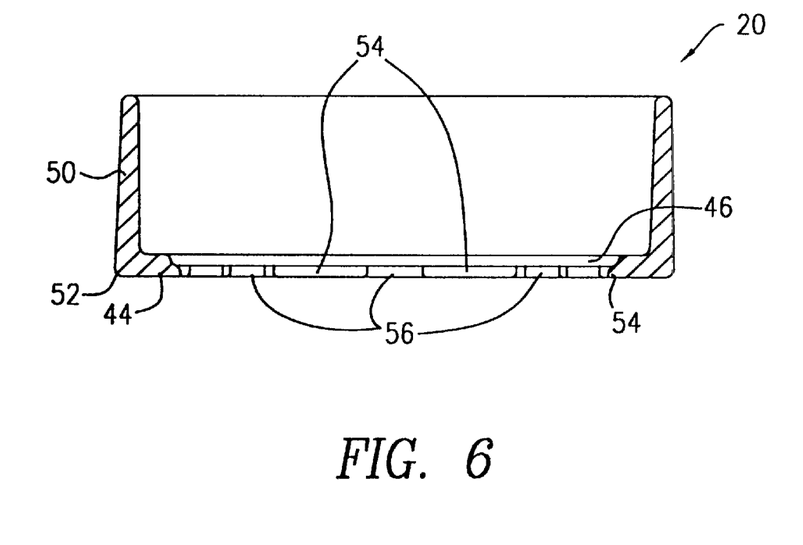
FIG. 6 is a cross-sectional view of the snap-on cuff shown in FIG. 5, taken along line B—B and looking in the direction of the arrows.

Referring now to FIGS. 5 and 6, the snap-on cuff 20 has a washer-like base 44, with an inner circumference 46, a central opening 48, and an annular wall 50 extending upward from an outer circumference 52 of the base 44. The inner circumference 46 of the base 44 is provided with an annular lip 54 of lesser thickness than the base 44 and corresponding to the thickness of the arcuate indents 34 between the mounting ridge 30 and the shoulder 12 of the fitting 10. The annular lip 54 has a plurality of cutouts 56 (preferably eight in number) that are spaced equidistant and opposite one another about the annular lip 54 and are sized and shaped to correspond to the locking flats 32 of the connector 14. The cutouts 56 increase the flexibility of the annular lip 54 for a purpose to be described hereinafter. In addition, there are typically twice as many cutouts 56 on the annular lip 54 as there are locking flats 32 on the connector 14 (e.g., eight versus four), also for a purpose to be discussed hereinafter.

Figure 7:
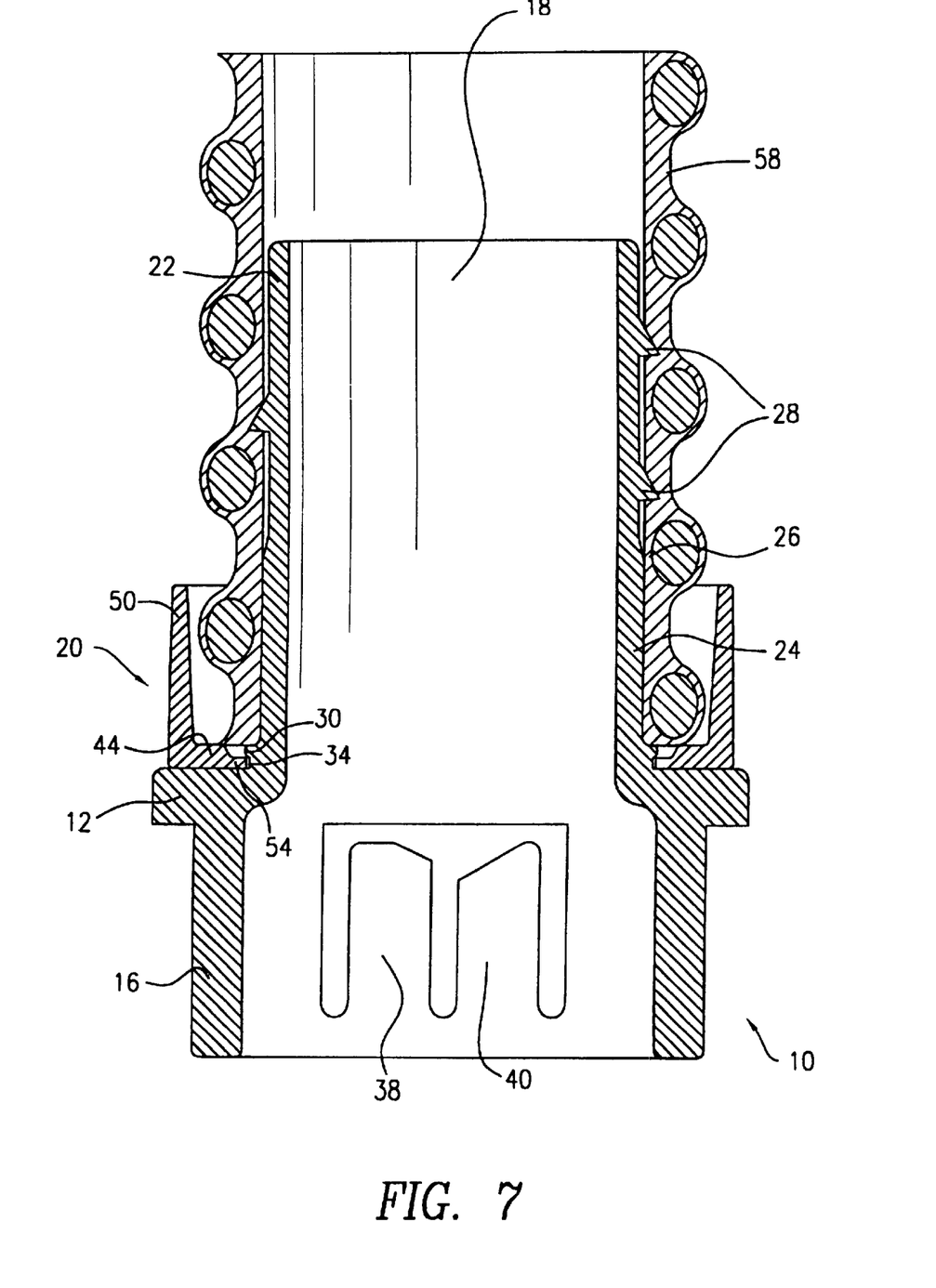
FIG. 7 is a cross-sectional view of the fitting and snap-on cuff of FIG. 1 in their assembled state with a flexible conduit mounted thereon.

FIG. 7 shows the fitting 10 of the present invention with a snap-on cuff 20 properly mounted thereon and also having a flexible conduit 58 mounted onto the distal end 22 of the connector 14. Prior to mounting the flexible conduit 58 onto the connector 14, the snap-on cuff 20 is mounted onto the fitting 10 by inserting the distal end 22 of the connector 14 through the central opening 48 of the base 44 of the snap-on cuff 20 from the direction opposite the annular wall 50. The snap-on cuff 20 is then slidingly moved down the connector 14, onto the collared portion 24 and against the annular mounting ridge 30 of the connector 14.

When the snap-on cuff 20 abuts the mounting ridge 30, it must be rotated about the connector 14 until the cutouts 56 align with the locking flats 32 of the connector 14, for preventing further rotation of snap-on cuff 20. The snap-on cuff 20 has twice as many cutouts 56 as the connector 14 has locking flats 32 because this reduces, by one half, the amount of rotation necessary to achieve the aforesaid alignment of the cutouts 56 with the locking flats 32. When the cutouts 56 and locking flats 32 are aligned, the snap-on cuff 20 is forced downward and, as shown in FIG. 7, the annular lip 54 (male member) is snappingly and securely received into the plurality of arcuate indents 34 (female member) formed between the mounting ridge 30 and shoulder 12 of the fitting 10 (see FIG. 7). As mentioned above, the cutouts 56 also provide additional flexibility to the annular lip 54, which is required to enable the annular lip 54 to move past the mounting ridge 30 and be received into the arcuate indents 34. Once the annular lip 54 is received in the arcuate indents 34, the snap-on cuff 20 is securely mounted onto the fitting 10.

With respect to the elements described above which facilitate mounting the snap-on cuff 20 securely onto the fitting 10, it should be noted that alternative arrangements are possible. For example, instead of the foregoing arrangement, the snap-on cuff 20 could be provided with a female mating member (i.e., arcuate indents similar to the arcuate indents 34 and an annular mounting ridge similar to the mounting ridge 30) and a plurality of locking flats (similar to the locking flats 32) and the connector 14 of the fitting 10 could be provided with a male mating member (i.e., an annular lip similar to the annular lip 54) having a plurality of cutouts (similar to the cutouts 56). The assembly and operation would be substantially the same as described above, except that the mounting ridge of the snap-on cuff 20 would now grip and lock onto the annular lip of the connector 14.

Referring still to FIG. 7, the flexible conduit 58 is mounted onto the connector 14 by twisting it onto the connector 14 such that the external thread 28 engages the inner surface of the flexible conduit 58. As the flexible conduit 58 is screwed further onto the connector 14, the small annular shoulder 26 of the connector 14 pushes outwardly on the flexible conduit 58 and the collared portion 24 maintains this outward force as the end of the conduit approaches the shoulder 12 of the fitting 10, all of which results in a secure and liquid-tight connection between the connector 14 and the flexible conduit 58. As can be seen in FIG. 7, when the flexible conduit 58 is mounted onto the fitting 10 having the snap-on cuff 20, the annular wall 50 of the snap-on cuff 20 conceals the cut end of the conduit 58 from view. The annular wall 50, which is flexible, does not exert any appreciable force on the conduit 58 due to their spaced relationship.

Referring to FIGS. 1A, 1B and 7, while the aperture engaging means 16 is well known in the prior art, in combination with the fitting 10 it is particularly labor saving. The connection of the fitting 10 and the conduit 58 to an aperture, such as is found on a junction box, panel box, motor or other similar device, is achieved very quickly and easily by pushing the aperture engaging means 16 into an aperture until the resilient fingers 38,40 snap-lock into the aperture.

The fitting 10, having the connector 14, the shoulder 12 and the aperture engaging means 16, is typically formed as a single piece, out of nylon or a similar plastic or polymeric material, by injection molding. Similarly, the snap-on cuff 20 is also formed out of nylon or a similar plastic or polymeric material, by injection molding. It should be noted that because the snap-on cuff 20 is easily and quickly mounted onto the fitting 10, the single-piece fitting 10 and the snap-on cuff 20 can be marketed and sold in either pre-assembled form or as separate pieces to be assembled upon use.

FIGS. 8–10 and FIGS. 11 and 12 depict second and third embodiments, respectively, of the present invention. Elements illustrated in FIGS. 8–10 and FIGS. 11 and 12 which correspond, either identically or substantially, to the elements described above with respect to the embodiment of FIGS. 1A–7 have been designated by corresponding reference numerals increased by one hundred and two hundred, respectively. Unless otherwise stated, the embodiments of FIGS. 8–10 and FIGS. 11 and 12 are constructed, assembled and operated in the same basic manner as the embodiment of FIGS. 1A–7.

Figure 8:
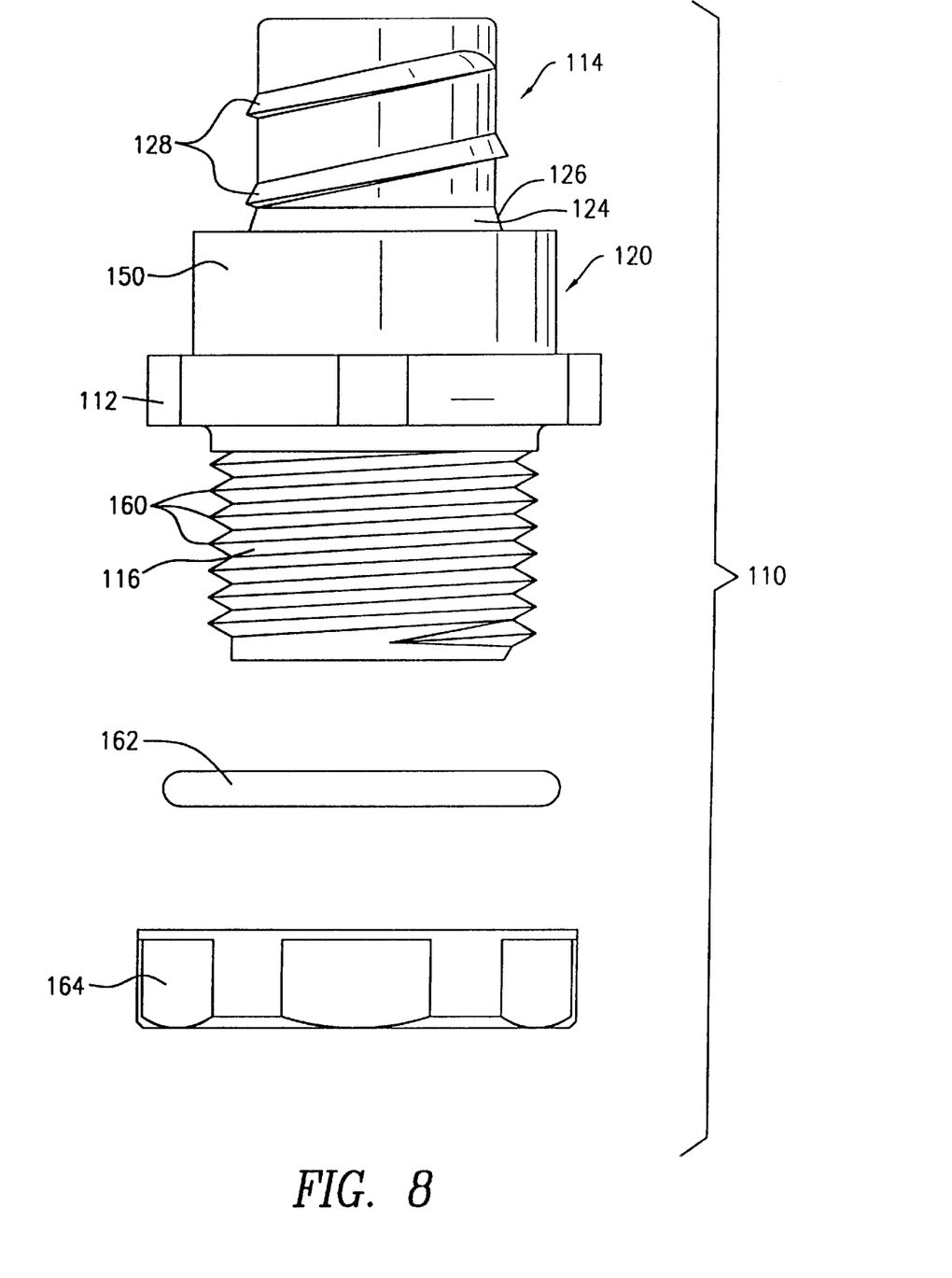
FIG. 8 is an exploded elevational view of a first alternative embodiment of the fitting of the present invention.
Figure 9:
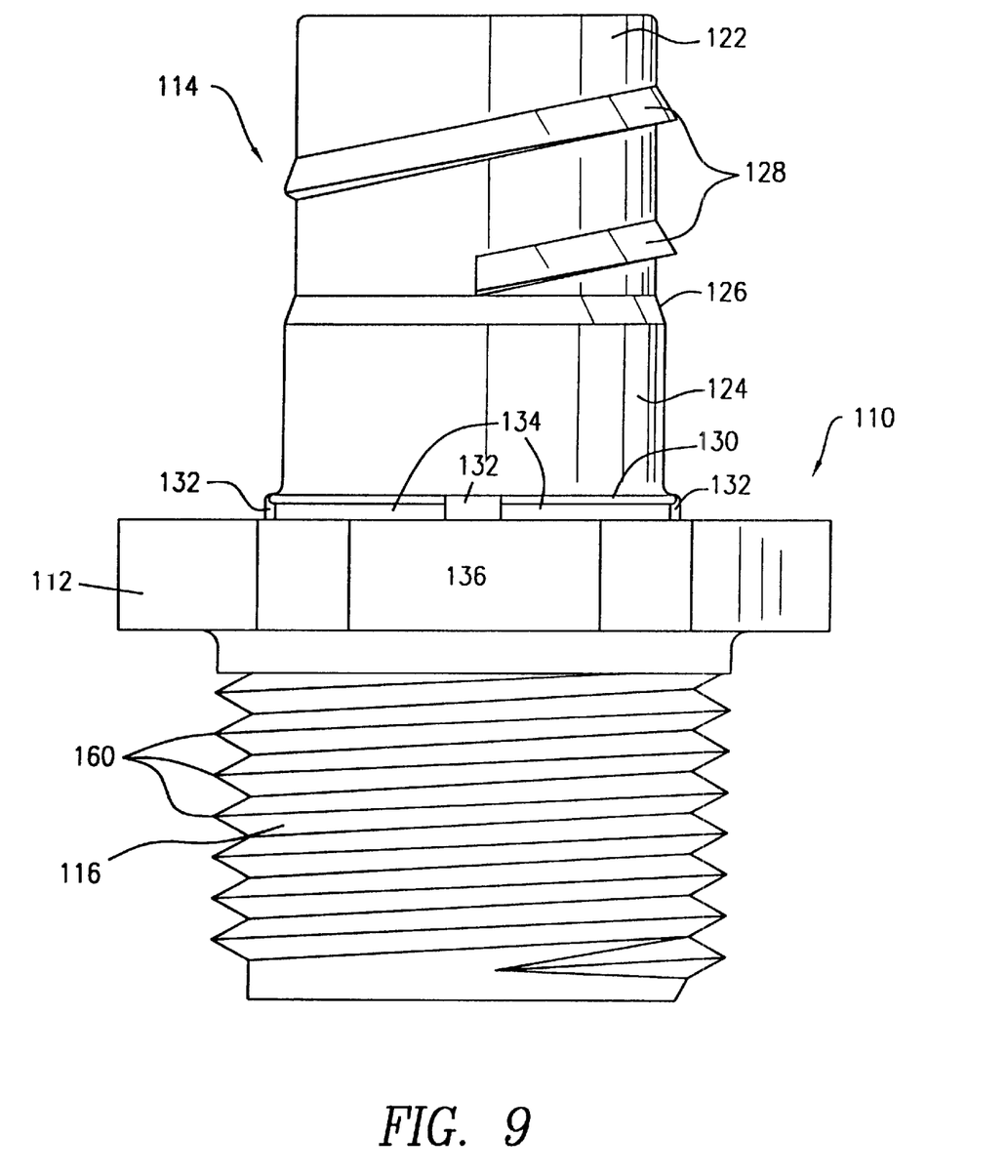
FIG. 9 is an elevational view of the fitting of FIG. 8 without its snap-on cuff, seal or nut.
Figure 10:
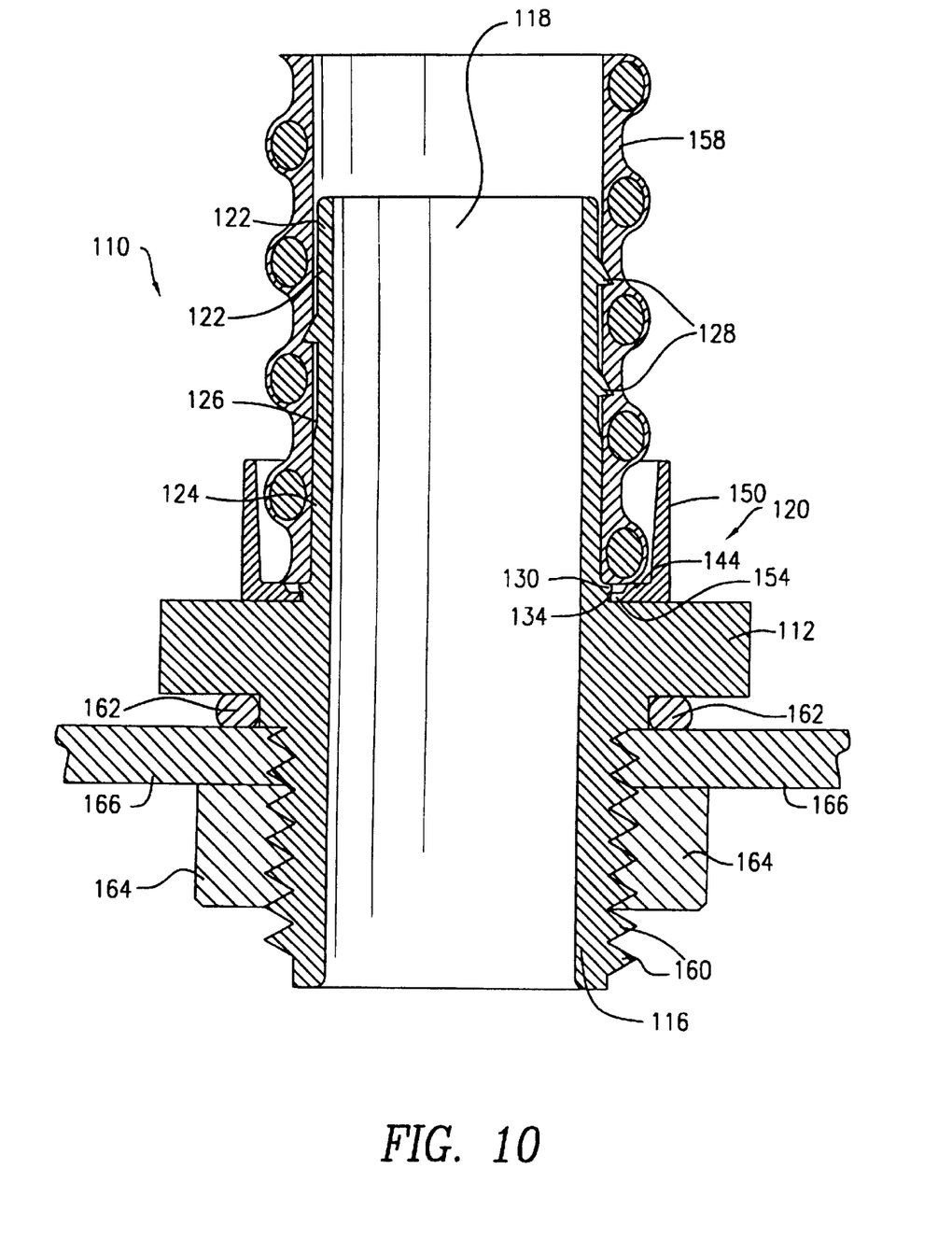
FIG. 10 is a cross-sectional view of the fitting of FIG. 8 shown in its fully assembled state and connected to the wall of a junction box, a flexible conduit being mounted on the fitting.

Referring now to FIGS. 8–10, in general, and FIG. 8, in particular, a first alternative embodiment of a fitting 110, constructed in accordance with the present invention, is shown having a shoulder 112, an internal liquid-tight connector 114, a snap-on cuff 120 and an threaded aperture engaging means 116 for engaging the fitting with an aperature of a junction box (not shown, see FIG. 10). More particularly, the threaded aperture engaging means 116 of this first alternative embodiment has external threads 160, rather than fingers (see, e.g., FIG. 1A, elements 38, 40), for securing the fitting 110 to a junction box. In addition, the threaded aperture engaging means 116 may also include a seal 162, such as the O-ring shown in FIG. 8, as well as an internally threaded nut 164 that is sized and shaped to correspond to the external threads 160 of the threaded aperture engaging means 116. The seal 162 ensures a liquid-tight connection between the fitting 110 and the junction box (not shown). The nut 164 facilitates a secure connection between the threaded aperture engaging means 116 of the fitting 110 and the junction box (not shown).

Referring now to FIGS. 8–10, it can be seen that the shoulder 112, the connector 114 and the snap-on-cuff 120 are all configured and operate in the same manner as in the preferred embodiment of FIGS. 1A–7. As shown in FIG. 9, like the preferred embodiment, the connector 114 of the alternative embodiment is also provided with an annular mounting ridge 130 and a plurality of locking flats 132 for aligning and securely locking the snap on cuff 120 into place on the fitting 110. The snap-on cuff 120 is exactly the same as in the preferred embodiment.

Referring now particularly to FIG. 10, the fitting 110 of the first alternative embodiment is shown engaged with the wall 166 of a junction box and having a flexible conduit 158 mounted thereon. As can be seen in FIG. 10, the seal 162 is first slid onto the threaded aperture engaging means 116 such that it abuts the shoulder 112 and the threaded aperture engaging means 116 is then screwed into an aperture in the wall 166 of the junction box until the seal also abuts the wall 166. Thereafter, the nut 164 is screwed onto the threaded aperture engaging means 116 from inside the junction box to further secure the fitting 110 to the junction box.

Figure 11:
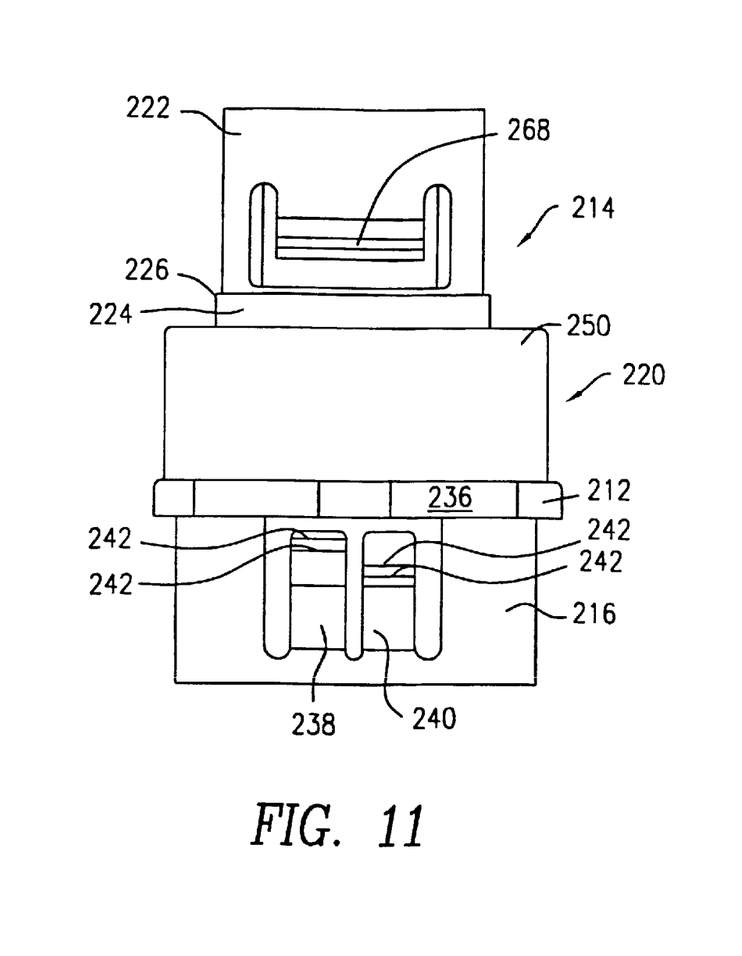
FIG. 11 is a front elevational view of a second alternative embodiment of the fitting of the present invention, having a snap connector adapted for connecting to corrugated conduit and having a snap-on cuff mounted thereon.
Figure 12:
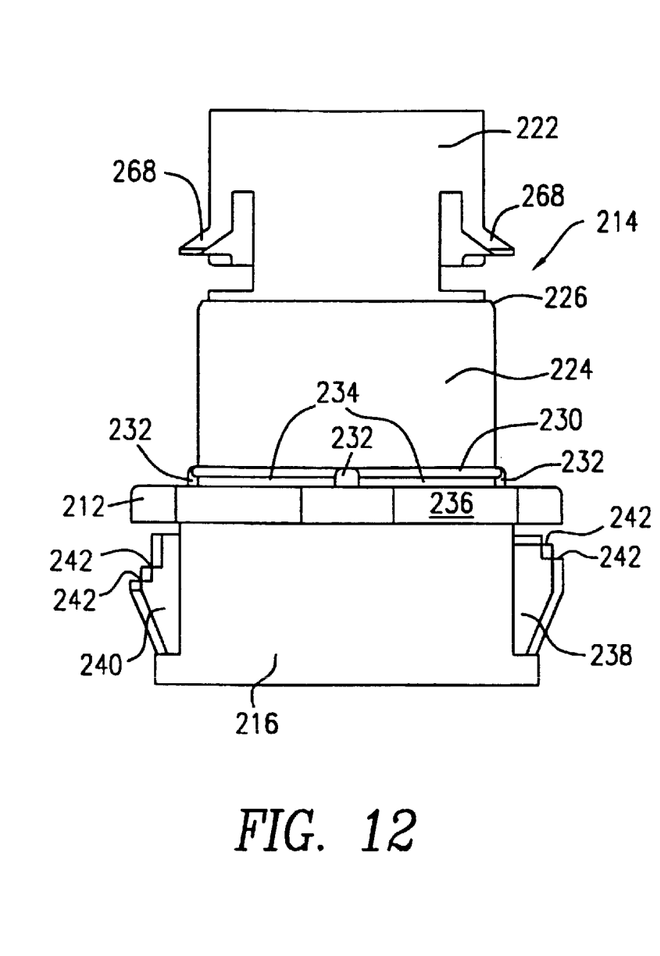
FIG. 12 is a side elevational view of the fitting of FIG. 11, without the snap-on cuff.

With reference now to FIGS. 11 and 12, a second alternative embodiment of the present invention is shown being adapted for use with the fitting disclosed in U.S. Pat. No. 5,346,264, the entire disclosure of which is hereby incorporated herein by reference. The fitting 210 includes an internal liquid-tight snap connector 214 having resilient pawls 268 that are described in greater detail in the specification of U.S. Pat. No. 5,346,264. More particularly, the resilient pawls 268 are designed to connect the fitting 210 to a flexible corrugated conduit (not shown) by gripping the internal corrugations thereof. As shown in FIGS. 11 and 12, the fitting 210 can be adapted to receive a snap-on cuff 220 that is constructed and operated in the same manner as discussed above in connection with the preferred embodiment and the first alternative embodiment.

With particular reference to FIG. 11, the snap-on cuff 220 is securely mounted onto the fitting 210 in the same manner as described above in connection with the foregoing embodiments. With particular reference now to FIG. 12, the snap connector 214 is provided with an annular mounting ridge 230 and a plurality of locking flats 232 that are configured the same as in the previously discussed embodiments. Thus, a plurality of arcuate indents 234 is formed between mounting ridge 230 and the shoulder 212 of the fitting 210.

It should be noted that the snap-on cuff 20, 120, 220 of each of the foregoing embodiments is constructed and operated in exactly the same manner. This provides an advantage in that an inventory of the snap-on cuffs 20, 120, 220 constructed in accordance with the present invention are interchangeably usable with all three types of the fittings 10, 110, 210 disclosed herein, as well as other types not specifically disclosed.

It will be understood that the embodiments described herein are merely exemplary and that a person skilled in the art may make many variations and modifications without departing from the spirit and scope of the present invention. Another type of fitting, for instance, might include a threaded aperture engaging means (like the threaded aperture engaging means 116 of the first alternative embodiment) and a snap connector (like the snap connector 214 of the second alternative embodiment). All such variations and modifications are intended to be included within the scope of the invention.

I claim:

1. A tubular fitting adapted to connect flexible conduit to an aperture in electrical equipment, said tubular fitting comprising engaging means, at one end of said fitting, for engaging an aperture; connecting means for connecting a flexible conduit to an opposite end of said fitting, said connecting means including a tubular member having a small diameter portion proximate said opposite end of said fitting and a large diameter portion between said small diameter portion and a shoulder extending outwardly from said fitting between said engaging means and said connecting means; first snap-on means positioned between said connecting means and said engaging means, said first snap-on means including a female member which is formed in said large diameter portion adjacent to said shoulder and which includes an annular trough provided with a plurality of arcuate indents; and a cuff positioned intermediate said ends of said fitting, said cuff including concealing means for concealing a free conduit end from view; and second snap-on means cooperating with said first snap-on means to form a snap-fit connection between said cuff and said fitting, said second snap-on means including a male member which is sized and shaped so as to mate with said female member, said male member being formed on said cuff and including an annular lip provided with a plurality of arcuate cutouts.

2. A tubular fitting according to claim 1, wherein said trough includes a plurality of arcuate locking flats, each locking flat separating a corresponding pair of said indents from each other.

3. A tubular fitting according to claim 2, wherein each of said locking flats is alignable with a corresponding one of said cutouts.

4. A tubular fitting according to claim 3, wherein said locking flats cooperate with said lip to inhibit the arcuate rotation of said cuff relative to said fitting.

5. A tubular fitting according to claim 4, wherein said lip is flexible.

6. A tubular fitting according to claim 5, wherein said small diameter portion is externally threaded, whereby said connecting means is especially adapted to receive a corrugated conduit.

7. A tubular fitting according to claim 5, wherein said small diameter portion includes at least a pair of resilient pawls, whereby said connecting means is especially adapted to receive a corrugated conduit.

8. A tubular fitting according to claim 5, wherein said large diameter portion is sized and shaped so as to exert an outward force on an inner surface of a conduit which is attachable to said fitting, thereby forming a liquid-tight connection therebetween.

9. A tubular fitting according to claim 5, wherein said engaging means includes at least a pair of resilient snap-lock fingers.

10. A tubular fitting according to claim 5, wherein said engaging means includes a series of external threads.

11. A tubular fitting according to claim 1, wherein said fitting has a bore which extends therethrough from said one end to said opposite end.

12. A tubular fitting adapted to connect flexible conduit to an aperture in electrical equipment, said tubular fitting comprising engaging means, at one end of said fitting, for engaging an aperture; connecting means for connecting a flexible conduit to an opposite end of said fitting, said connecting means including a tubular member having a small diameter portion proximate said opposite end of said fitting and a large diameter portion between said small diameter portion and a shoulder extending outwardly from said fitting between said engaging means and said connecting means; first snap-on means positioned between said engaging means and said connecting means, said first snap-on means including an annular ridge extending circumferentially about said large diameter portion in close proximity to said shoulder and an annular trough which includes a plurality of arcuate indents and which extends circumferentially about said large diameter portion between said shoulder and said ridge; a cuff positioned intermediate said ends of said fitting, said cuff including a washer-like base abutting said shoulder, and concealing means, including an annular wall extending from said base toward said opposite end of said fitting, for concealing a free conduit end from view, said wall being spaced from said large diameter portion a distance selected such that said wall is close enough to said large diameter portion to conceal a free end of a conduit which has been inserted up to said base, but is far enough from said large diameter portion so as not to interfere with conduit insertion; and second snap-on means cooperating with said first snap-on means to form a snap-fit connection between said cuff and said fitting, said second snap-on means including a flexible annular lip which is sized and shaped so as to snap into said trough over said ridge, said lip projecting generally radially inward from said base and including a plurality of arcuate cutouts.

13. A tubular fitting according to claim 12, wherein said trough includes a plurality of arcuate locking flats, each locking flat separating a corresponding pair of said indents from each other.

14. A tubular fitting according to claim 13, wherein each of said locking flats is alignable with a corresponding one of said cutouts.

15. A tubular fitting according to claim 14, wherein said locking flats cooperate with said lip to inhibit the arcuate rotation of said cuff relative to said fitting.

16. A tubular fitting according to claim 15, wherein said cutouts increase the flexibility of said lip.

17. A tubular fitting according to claim 16, wherein said large diameter portion is sized and shaped so as to exert an outward force on an inner surface of a conduit which is attachable to said fitting, thereby forming a liquid-tight connection therebetween.

18. A tubular fitting according to claim 12, wherein said wall of said cuff is flexible.

19. A tubular fitting according to claim 12, wherein said fitting has a bore which extends therethrough from said one end to said opposite end.

* * * * *